(12) United States Patent
Ochiai et al.

(10) Patent No.: US 6,997,294 B2
(45) Date of Patent: Feb. 14, 2006

(54) ELECTROMAGNETIC CLUTCH DEVICE

(75) Inventors: Tomiaki Ochiai, Tochigi (JP); Takeshi Hoshinoya, Hamamatsu (JP)

(73) Assignee: Tochigi Fuji Sangyo Kabushiki Kaisha, Tochigi (JP)

( * ) Notice: Subject to any disclaimer, the term of this patent is extended or adjusted under 35 U.S.C. 154(b) by 0 days.

(21) Appl. No.: 10/731,563

(22) Filed: Dec. 8, 2003

(65) Prior Publication Data
US 2004/0118653 A1   Jun. 24, 2004

(30) Foreign Application Priority Data
Dec. 10, 2002 (JP) .............................. 2002-357847
Feb. 28, 2003 (JP) .............................. 2003-054517

(51) Int. Cl.
*F16D 27/10*   (2006.01)
*F16D 27/115*   (2006.01)

(52) U.S. Cl. .................... 192/35; 192/84.7; 192/84.91
(58) Field of Classification Search ................. 192/35, 192/84.7, 84.91, 84.93, 84.96; 335/304
See application file for complete search history.

(56) References Cited

U.S. PATENT DOCUMENTS

| | | | |
|---|---|---|---|
| 3,789,966 A * | 2/1974 | Miller ......................... | 192/35 |
| 5,911,291 A * | 6/1999 | Suetake et al. ................ | 192/35 |
| 6,109,408 A * | 8/2000 | Ikeda et al. ................... | 192/35 |
| 6,851,535 B1 * | 2/2005 | Nakaba et al. ................. | 192/35 |
| 2002/0033311 A1 * | 3/2002 | Yamamoto et al. ........... | 192/35 |
| 2003/0015385 A1 * | 1/2003 | Ishikawa et al. .............. | 192/35 |
| 2005/0003923 A1 * | 1/2005 | Ishikawa ..................... | 475/223 |

FOREIGN PATENT DOCUMENTS

| | | |
|---|---|---|
| JP | 64-022633 | 1/1989 |
| JP | 11-287258 | 10/1999 |
| WO | WO 02/18810 A1 * | 3/2002 |

* cited by examiner

*Primary Examiner*—Rodney H. Bonck
(74) *Attorney, Agent, or Firm*—Morrison & Foerster, LLP

(57) ABSTRACT

An electromagnetic clutch 1 is disclosed having a magnetic flux loop 31 formed, in magnetic flux loop forming members 5, 7, 9, 11, 13 involving an electromagnet 5 and an armature 13, by the electromagnet 5 to allow the armature 13 to be operatively shifted to couple and uncouple a clutch 11, and a proximate member, close proximate to the members 5, 7, 9, 11, 13, includes magnetic flux leakage minimizing sections 15, 17, 19, 21, 23, 25 that minimize magnetic fluxes leaked from the armature 13 to the proximate member.

20 Claims, 6 Drawing Sheets

ELECTROMAGNETIC CLUTCH DEVICE

CROSS REFERENCE TO RELATED APPLICATION

This application claims benefit of priority under 35 U.S.C. § 119 to Japanese Patent Applications No. 2002-357847 with a filing date of Dec. 10, 2002 and No. 2003-3054517 with a filing date of Feb. 28, 2003, the entire contents of which are incorporated by reference herein.

BACKGROUND OF THE INVENTION

The present invention relates to an electromagnetic clutch device for operating a clutch through which a drive power or a braking for are transferred.

An electromagnetic type friction clutch deice disclosed in Japanese Patent Application Laid-Open No. H11-287258 is comprised of an outer case composed of a front housing, made from non-magnetic material (aluminum alloy) and connected between a transfer and a transmission through a propeller shaft, and a rear housing made from magnetic material and screwed onto an opening of the front housing, an inner shaft connected to a rear def, an armature, an electromagnet, a cam mechanism, a first cam member, a second cam member spline connected to the inner shaft, a main clutch disposed between the front housing and the inner shaft, and a pilot clutch disposed between the front housing and the first cam member.

In such an electromagnetic type friction clutch device, a magnetic flux path (hereinafter referred to as a magnetic path) of the electromagnet is formed with a yoke of the electromagnet, the rear housing, the pilot clutch and the armature. Upon excitation of the electromagnet, a magnetic flux loop is formed in the magnetic path to allow the armature to be attracted. This causes the pilot clutch to be urged and coupled, with a transfer torque between the outer case and the inner shaft being applied to the cam mechanism. When this takes place, cam thrust force is created and applied through the second cam member to cause the main clutch to be coupled, and a drive power of an engine is transferred to rear wheels to allow a vehicle to fall in a four-wheel drive condition. Also, as the excitation of the electromagnet is interrupted, the pilot clutch is uncoupled to cause the thrust force of the cam mechanism to disappear and the main clutch is uncoupled to allow the vehicle to fall in a two-wheel drive condition.

Further, a vehicular def lock device disclosed in Japanese Patent Application Laid-Open No. S64-22633 is comprised of a bevel type differential mechanism, and a dog clutch disposed between a def case and a plunger, made from magnetic material, to lock resulting differential rotation, an electromagnetic type actuator for coupling the dog clutch, and a return spring for uncoupling the dog clutch.

The plunger is axially and moveably connected to a vehicle axle of a left side gear through a splined section and urged in a direction in which the dog clutch is uncoupled by a return spring.

The electromagnet type actuator is comprised of a plunger and an electromagnetic coil wound on a bearing housing, made from magnetic material, concentrically disposed on an outer periphery of the plunger, and the plunger and the bearing housing form a magnetic path of the electromagnetic coil. During a period in which the electromagnetic coil remains unexcited, the plunger responds to an urging force of the return spring and remains in a position to uncouple the dog clutch and unlock the differential lock of the differential mechanism. Also, as the electromagnetic coil is excited, a magnetic flux loop is created in the above-described magnetic path, and a resulting magnetic force results in a shifting operational force to shift the plunger rightward, rendering the dog clutch to be coupled thereby locking differential movement of the differential mechanism.

SUMMARY OF THE INVENTION

However, in the electromagnet type friction clutch disclosed in Japanese Patent Application Laid-Open No. H11-287258, the inner shaft, the needle bearing between the rear housing and the inner shaft, and the first cam member are disposed close proximate to the magnetic path in which the magnetic flux loop is formed.

Since any of these components are made from magnetic material of iron system that forms a strength member, excitation of the electromagnetic coil causes several localized magnetic paths, through which magnetic fluxes leak through the above-described respective members to other areas than a normal magnetic flux loop, to be formed about a circumference of normal magnetic flux loop. The presence of magnetic fluxes leaked from such a normal magnetic flux loop causes losses of magnetic force and excitation current to increase, resulting in deterioration of a shifting operational force of the electromagnet type friction clutch device.

Further, in the vehicular def lock device disclosed in Japanese Patent Application Laid-Open No. S64-22633, since the vehicle axle is made from alloy steel axle that is magnetic material, excitation of the electromagnetic coil results in formation of a localized magnetic path through which the magnetic fluxes leak to the circumference of the normal magnetic flux loop through the vehicle axle. Due to the presence of the magnetic fluxes leaked from the magnetic paths other than such a normal magnetic flux loop, losses of magnetic force and excitation current increase, resulting in deterioration of a shifting operational force of the electromagnet type actuator.

If the shifting operational forces of the electromagnet type friction clutch and the electromagnet type actuator are decreased for such a reason set forth above, an issue arises wherein deterioration and unevenness occur in operating responses of various clutches, resulting in lack of smoothness in operation with an ease of instability.

Also, since a differential torque is applied to the splined section, frictional resistance caused in the splined section results in shifting resistance of the plunger, another issue arises in that this shifting resistance causes deterioration and unevenness in operating response with resultant further decrease in a stability of operation.

Further, since the splined section is applied with a differential torque, frictional resistance occurring in the splined section results in shifting resistance of the plunger, causing issues such as deteriorated and uneven operating response and further decrease in a stability of operation.

Moreover, if the operating responses of these clutches are deteriorated to cause unstable operation, an issue arises to damage an effect to improve an escaping ability and running capability of the vehicle during traveling on rough roads and an effect to avoid the stack.

It is conceivable to take a measure for these issues by permitting the peripheral members associated with the normal magnetic flux loop to be merely substituted with other members, made from non-magnetic materials such as aluminum alloy and stainless steel, for thereby precluding the magnetic fluxes from leaking to the outside. However, with these non-magnetic materials, an adequate strength cannot be enhanced while at the same time, resulting in new issues such as a remarkable increase in manufacturing cost because they are expensive.

Also, another measure to be considered is to form the electromagnetic coil in a large size or to increase excitation current with a view to increasing the magnetic force for thereby compensating a shortage of magnetic fluxes resulting from leakage of the magnetic fluxes. But, in this case, another new issue such as an increase in load of the battery is encountered and fuel consumption of the engine is deteriorated while, at the same time, the electromagnetic coil is increased in size accompanied by an increased weight resulting in deterioration in an on-vehicle mount capability of the vehicular def lock device.

It is, therefore, an object of the present invention to provide an electromagnetic clutch device, in which an armature is operatively shifted by an electromagnetic coil, that is able to eliminate leakage of magnetic fluxes from a magnetic flux loop to improve an energy efficiency for precluding a shifting operational force of the electromagnetic coil from being deteriorated whereby smooth and stable operation and operating response can be obtained in a desired clutch control characteristic without causing an electromagnet and the electromagnetic coil to be formed in a large size in structure, an increase in excitation current and an increase in electric power consumption.

A first aspect of the present invention is an electromagnetic clutch comprising a magnetic flux loop forming member including an electromagnet, having a coil and a yoke, and an armature and forming a magnetic flux loop upon excitation of the coil, a clutch operative to be coupled or uncoupled by the armature that is operatively shifted in response to an electromagnetic force occurring during excitation of the coil, and a proximate member placed close proximate to the magnetic flux loop forming member, wherein at least one of the magnetic flux loop forming member and the proximate member includes a magnetic flux leakage eliminating section eliminating an amount of magnetic fluxes leaked from the magnetic flux loop forming member to the proximate member during excitation of the coil.

A second aspect of the present invention is an electromagnetic clutch device comprising a magnetic flux loop forming member including an electromagnet, having a coil and a yoke; a rotor, an armature and a friction plate whose rotation is limited through shifting operation of the armature and operative to allow magnetic fluxes to pass to form a magnetic flux loop upon excitation of the coil, and a plurality of proximate members placed close proximate to a circumferential circumference of the magnetic flux loop forming member, wherein a spaced portion is formed in a part of opposing surfaces between the magnetic flux loop forming member and the proximate member with a view to decreasing a magnetic permeability of magnetic fluxes passing from the magnetic flux loop forming member to the proximate member for permitting the magnetic fluxes to be directed in a direction of the magnetic flux loop.

DETAILED DESCRIPTION OF THE PREFERRED EMBODIMENTS

Hereinafter, various embodiments of electromagnetic clutch devices of the present invention are described with reference to the accompanying drawings.

(First Embodiment)

Figure 1:
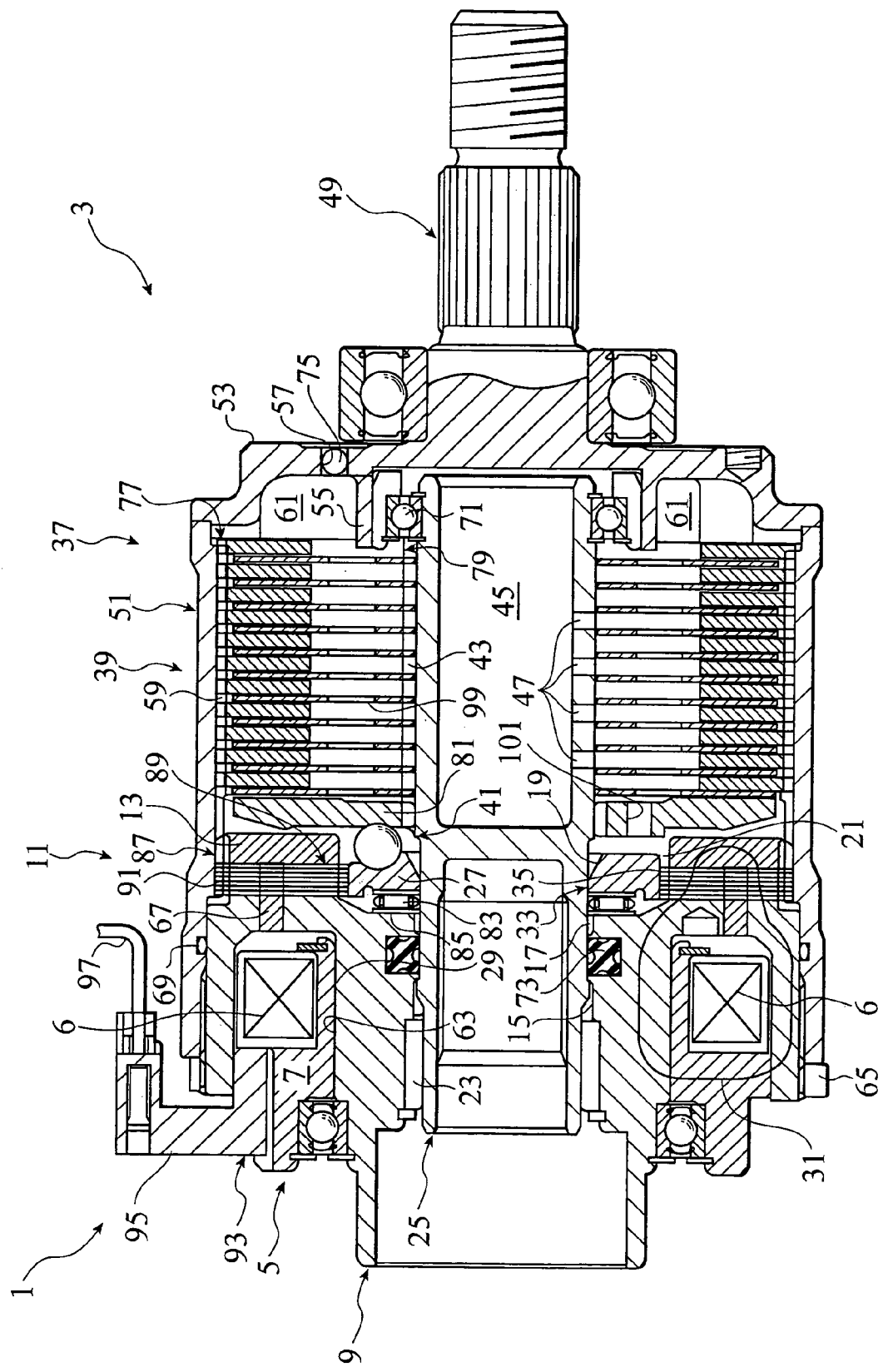
FIG. 1 is a cross sectional view illustrating a first embodiment of the present invention.
Figure 2:
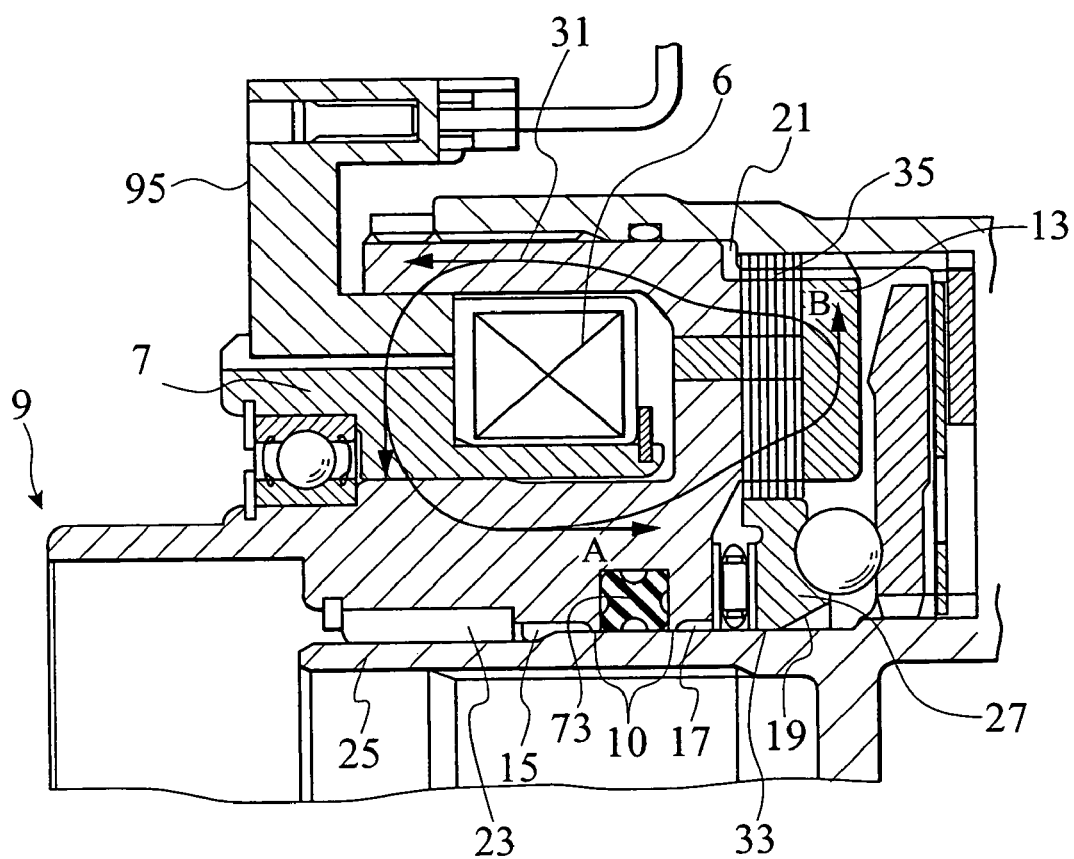
FIG. 2 is an enlarged view showing an essential part, in a large scale, of the first embodiment of the present invention.

Initially, a first embodiment of the present invention is described with reference to FIGS. 1 and 2. FIG. 1 is a cross sectional view of a power coupling and uncoupling device (electromagnetic coupling) 3 incorporating an electromagnetic clutch 1 of the first embodiment. FIG. 2 is an enlarged view illustrating an essential part of the first embodiment. Also, by the term "a left and right direction" is meant the left and right direction of the vehicle, and the right side in FIG. 1 corresponds to a front (closer to an engine) of a four-wheeled vehicle. Also, component elements with no reference numerals are not shown.

This power system is comprised of an engine (prime mover), a transmission, a transfer, a front def (differential unit by which a drive power of the engine is split to left and right front wheels), a front axle, left and right front wheels, a front propeller shaft, the power coupling and uncoupling device 3, a rear propeller shaft, a rear def (differential unit by which the drive power of the engine is split to left and right rear wheels), a rear axle, and left and right rear wheels. The power coupling and uncoupling device 3 is used in a power system of a four-wheel drive vehicle.

The drive power of the engine is delivered from the transmission to the front def from which the drive power is then distributed to the left and right front wheels through the front axle. The rotation of the engine is delivered from the transfer to the power coupling and uncoupling device 3 through the propeller shaft.

Upon coupling of the power coupling and uncoupling device 3, the drive power of the engine is delivered through the propeller shaft to the rear def, from which the drive power is further distributed to the left and right rear wheels through the rear axle, rendering the vehicle to be operative in a four-wheel drive condition. Also, upon uncoupling of the power coupling and uncoupling device 3, the component elements subsequent to the rear propeller shaft are disconnected, thereby allowing the vehicle to fall in a two-wheel drive condition.

The power coupling and uncoupling device 3 is intervened between the front and rear propeller shafts disposed in a rear power delivery system of the four-wheeled vehicle in such a way described above and operative to couple or uncouple the rear wheels while controlling a magnitude of the drive power to be transferred to the rear wheels.

[Structure of Electromagnetic Clutch Device 1]

The electromagnetic clutch device 1 is comprised of an electromagnet (a coil 6 and a coil housing (yoke) 7), a rear rotor 9 made from iron alloy (of magnetic material), a multi-plate type pilot clutch 11 (clutch: with sliding frictional surfaces intervening between the rotor and an armature that will be described later), an armature 13, air gaps (spatial areas, i.e., spaced portions) 15, 17, 19, 21, a slide bearing 23 (proximate (support) member coaxially disposed close proximate to a periphery (magnetic flux loop forming member) of the magnetic flux loop 31, which will be described below, and made from material with a magnetic permeability lower than that of the magnetic flux loop forming member), an inner shaft 25 (proximate (shaft) member coaxially disposed close proximate to a periphery (magnetic flux loop forming member) of the magnetic flux loop 31 and made from material with a magnetic permeability lower than that of the magnetic flux loop forming member), a cam ring 27 (proximate (support) member coaxially disposed close proximate to the periphery (magnetic flux loop forming member) of the magnetic flux loop 31), and a controller (not shown).

Any of the electromagnet 5 (i.e., the coil 6 and the coil housing (yoke) 7), the rotor 9, the pilot clutch 11 and the armature 13 forms a ring-like magnetic flux loop forming member and, in addition to these components, an air gap 29 defined between the coil housing 7 and the rotor 9 forms a magnetic path in which a normal magnetic flux loop 31 of the electromagnet 5 is formed. This allows the armature 13 to be attracted causing the pilot clutch 11 to be coupled. Also, by the term "magnetic flux" is meant the flux of a integral curve (that is a line of magnetic force) of a magnetic field (as a vector field) that generates in the magnetic flux loop forming member during excitation of the coil, and by the term "magnetic flux loop" is meant the lines of magnetic forces which form closed curves in the magnetic flux loop forming member. The magnetic flux loop 31 is described in FIGS. 1 and 2 under a state where only one of the lines of magnetic forces which form such closed curves is taken out. Also, arrows in FIG. 2 represent directions (corresponding to substantially tangential directions) of magnetic forces at four points on the above-described magnetic flux loop 31. The orientation of the arrow is opposite in direction to those shown in FIG. 2 upon change of direction in which the electric current flows through the coil. It is not objectionable for the orientation of the arrow to be clockwise or counter-clockwise. Then, in the embodiments of the present invention, "a direction of the magnetic flux loop" is defined as a direction along the line of magnetic force during excitation of the coil.

Further, as shown in FIG. 2, the air gaps 15, 17, 19, 21, the slide bearing 23 and the inner shaft 25 form magnetic leakage minimizing means (magnetic leakage minimizing sections of the electromagnetic clutch device 1), respectively, to provide these components with abilities to minimize localized magnetic flux loops (through which the magnetic fluxes are leaked to peripheral members) occurring from the magnetic path 31 for thereby increasing the magnetic fluxes passing to the armature 13.

The slide bearing 23 is made from magnetic materials, such as Fe (Iron), C (Carbon) and Ni (Nickel), whose percentage content is lowered to allow the slide bearing 23 to have a magnetic permeability lower than that of each magnetic flux loop forming member set forth above. Also, in order for the slide bearing 23 to have a low magnetic permeability, there are one way to increase the percentage content of non-magnetic material such as Al (Aluminum), or the other way to allow the slide bearing 23 and the inner shaft 25 to be made from Al, Cu and stainless steel. Also, the percentage contents and materials per se of the respective members, involving the inner shaft 25, that have been referred to above as the proximate members, can be similarly chosen in the same way as those of the slide bearing 23.

Moreover, the inner shaft 25 is close proximate to the peripheries (magnetic flux loop forming members) of the magnetic flux loop 31 and coaxially aligned with the rotor 9 and the cam ring 27 for mutually supporting relationships with respect to one another. In addition, the rotor 9 and an inner periphery of the cam ring 27 and an outer periphery of the inner shaft 25 are centered through the slide bearing 23 or directly by means of a support member 33 disposed between these components.

The air gaps 15, 17 are formed on axially spaced areas (along a direction of the line of magnetic force corresponding to a tangential direction (line A) of the magnetic flux loop 31 shown in FIG. 2) by permitting opposed and mating portions between an inner periphery of the rotor 9 and the inner shaft 25 to be axially shortened. The air gap 15 is located adjacent to the slide bearing 23 in an axial direction (along the direction A of the line of magnetic force corresponding to the tangential direction (line A) of the magnetic flux loop 31 shown in FIG. 2). In the meanwhile, the air gap 19 is formed such that the support portion 33 (forming a center link section) of an inner circumferential periphery of the cam ring 27 is shortened in the axial direction (along the direction of the line of magnetic force corresponding to the tangential direction (line A) of the magnetic flux loop 31 shown in FIG. 2) at an area (at a forward area) remote from the respective magnetic flux loop forming members (forming the magnetic flux loop 31) described above. Also, the air gap 21 is formed by permitting a splined section 35, formed on an outer periphery of the cam ring 27, to be shortened at an area remote in the axial direction (to provide an air gap by increasing an opposing distance between the rotor 9 and the splined section 35). In particular, the air gap 21 is formed with respect to a direction of the line of magnetic force corresponding to the tangential direction (line B) of the magnetic flux loop 31 along a radial direction.

The slide bearing 23 is disposed on the inner shaft 25 at a rear end thereof (in an area opposite to the armature 13 with respect to the electromagnet 5 in the axial direction) in a manner set forth above to permit the inner periphery of the rotor 9 to be rotatably supported on the outer periphery of the inner shaft 25, and is made from stainless steel that has a lower magnetic permeability than that of each magnetic flux loop forming member. Also, In order for the slide bearing 23 to have a low magnetic permeability, the other alternative includes a method to allow the slide bearing 23 to be made from Al alloy or phosphor bronze. Thus, by locating the slide bearing 23 as a small member (to allow the same to intervene between the rotor 9 and the inner shaft 25), it is possible to restrict the amount of magnetic fluxes that would otherwise leak between the rotor 9 and the inner shaft 25. Also, as an additional function, the use of the slide bearing 23 allows a support between the rotor 9 and the inner shaft 25.

Thus, the air gaps 15, 17, 19, 21, the slide bearing 23 and the inner shaft 25 have magnetic reluctances, respectively, that minimize the localized magnetic flux loops occurring from the magnetic path 31 increasing the amount of magnetic fluxes passing through the magnetic path 31 to the armature 13, with a resultant increase in an energy efficiency.

[Structure of Power Coupling and Uncoupling device 3]

The power coupling and uncoupling device 3 is comprised of the electromagnetic clutch 1, a rotary case 37, a main clutch 39, a ball cam 41 and the controller (not shown).

Formed on the above-described inner shaft 25 that forms a part of the electromagnetic clutch 1 are a splined section 43 configured on an outer periphery, an oil sump 45, and four pieces of oil flow passages 47 in communication with the oil sump 45 and the main clutch 39. The inner shaft 25 penetrates into the rotary case 37 from a rearward area. Also, spline connected to the inner shaft 25 is a connecting shaft which is connected to the rear def through a coupling and a rear propeller shaft.

The rotary case 37 is comprised of a front power transfer shaft 49 made from steel material for an axle, a cylindrical member 51 made from aluminum alloy (non-magnetic body), and the above-described rotor 9. These components are integrally coupled to one another, thereby permitting the drive power of the engine to rotate the power transfer shaft 49 (together with the rotary case 37) through the coupling and the front propeller shaft. Formed on the power transfer shaft 49 are a flange section 53, a support section 55 coaxial therewith, and an oil aperture 57, with the flange section 53 being welded to a front opening area of the cylindrical member 51. Moreover, formed on an inner periphery of the cylindrical member 51 a splined section 59. Also, formed between the flange section 53 and the cylindrical member 51 is an oil sump 61 that increases the amount of oil capacity inside the rotary case 37. Formed on the rotor 9 is a ring-shaped concave section 63, that accommodates therein the electromagnet 5, through which the rotor 9 is screwed into a rear opening of the cylindrical member 51 and fixed in place by a double-nut function with a nut 65. Furthermore, as set forth above, the rotor 9 forming part of the magnetic path of the electromagnet 5 is separately divided into outer piece and an inner piece in a radial direction through a ring 67 made from stainless steel forming non-magnetic material, thereby avoiding a magnetic force from being short circuited in the magnetic path. Also, disposed between the cylindrical member 51 and the rotor 9 is an O-ring 69 that precludes leakage of oil and entry of extraneous materials from outside.

Further, the above-described inner shaft 25 has a front portion supported with the support section 55 of the power transfer shaft 49 by means of a ball bearing 71 and a rear portion supported by a rotor 9 by means of the above-described slide bearing 23. Disposed between the rotor 9 and the inner shaft 25 is an X-ring 73 that serves as a seal formed in an X-shape cross section. Also, as shown in FIG. 2, formed on the inner periphery of the rotor 9 on both sides of the X-ring 73 are extending portions 10 that partially extend radially inward from the rotor 9. Inner peripheral surfaces of the extending portions 10 (see FIG. 2) are disposed in opposition to the outer periphery of the inner shaft 25 with a minute gap so as not to be brought into contact with the outer periphery of the inner shaft 25. By so doing, the amount of magnetic fluxes leaking from the magnetic flux loop can be limited to the minimum while concurrently permitting a sealing function of the X-ring to be guaranteed. The rotary case 37 (forming the power coupling and uncoupling device 3) is tightly sealed with the 0-ring 69 and the X-ring 73. The rotary case 37, that is tightly sealed, is filled with oil from the oil aperture 57 of the power transfer shaft 49 and after oil has been filled, a check ball 75 is press fitted to the oil aperture 57 for a sealing capability. The oil filled in the rotary case 37 lubricates and cools mechanisms such as the main clutch 39 and the ball cam 41 accomodated in the rotary case 37.

The main clutch 39 is disposed between the rotary case 37 (involving the cylindrical member 51) and the inner shaft 25. An outer plate 77 is connected to a splined section 59 of the cylindrical member 51, and an inner plate 79 is coupled to the splined section 49 of the inner shaft 25.

The ball cam 41 is disposed between a pressure plate 81 and the above-described cam ring 27. The pressure plate 81 has an inner periphery coupled to the splined section 43 of the inner shaft 25 and serves to allow a thrust force of the ball cam 41 to urge the main clutch 39 against the rotary case 37, thereby causing the main clutch 39 to be coupled. The cam ring 27 is supported on the outer periphery of the inner shaft 25 by means of the support portion 33 in a manner set forth above. Disposed between the cam ring 27 and the rotor 9 are a thrust bearing 83 and a thrust washer 85 that bear a cam reacting force applied by the ball cam 41. The cam ring 27 and the rotary case 37 are disconnected by the pilot clutch 11 set forth above.

The pilot clutch 11 is disposed between the rotary case 37 (cylindrical member 51) and the cam ring 27. An outer plate 87 is coupled to a splined section 59 of the cylindrical member 51, and an inner plate 89 is coupled to the splined section 35 of the cam ring 27. Also, the outer and inner plates 87, 89 have respective circumferential peripheries on areas, corresponding to the above-described ring 67 that separates the rotor 9 into the outer and inner pieces in the radial direction, formed with cut-out portions 91 and bridge portions integrally connected therewith. The short-circuiting of the magnetic flux loop 31 is prevented by the ring 67 and the cut-out portions 91.

Disposed between the pilot clutch 11 and the pressure plate 81 is the above-described armature 13 whose outer periphery is coupled to the splined section 59 of the rotary case 37. The armature 13 is attracted by the magnetic path 31 of the electromagnet 5 in a manner set forth above such that the pilot clutch 11 is coupled.

Further, the coil housing 7 of the electromagnet 5 penetrates into the concave section 63 of the rotor 9 through the air gap 29 and is connected to a floor panel of the vehicle body via a support member 95 connected through a meshing section 93 to be restricted from being rotated. A lead wire 97 of the electromagnet 5 is pulled out from the coil housing 7 through the support member 95 and connected to an on-vehicle battery.

[Operations and Actions of Electromagnetic Clutch Device 1 and Power Coupling and Uncoupling device 3]

The controller performs excitation of the electromagnet 5, control of excitation current and interrupting of excitation thereof.

As the electromagnet 5 is excited by the controller, the magnetic flux loop 31 is created in the magnetic path defined by the coil housing 7, the air gap 29, the rotor 9, the pilot clutch 11 and the armature 13, and the armature 13 is attracted due to the magnetic flux loop 31 to cause the pilot clutch 11 to be urged and coupled, thereby producing a pilot torque. As the pilot torque is created, the drive power of the engine is applied to the ball cam 41 through the rotary case 37, the pilot clutch 11 and the cam ring 27. This results in a cam thrust force by which the main clutch 39 is urged through the pressure plate 81, causing the power coupling and uncoupling device 3 to be coupled.

As the power coupling and uncoupling device 3 is coupled, as set forth above, the drive power of the engine is delivered from the power coupling and uncoupling device 3 to the rear def through the propeller shaft and distributed to the left and right rear wheels to allow the vehicle to enter the four-wheel drive condition, thereby improving a running ability of the vehicle during traveling on rough roads and a stability of the vehicle body.

When this takes place, if the magnetic force to be generated by the electromagnet 5 is controlled through adjustment of excitation current effectuated by the controller, slippage occurs in the pilot clutch 11 and the pilot torque varies, causing the thrust force of the ball cam 41 to vary, thereby enable a coupling force (a drive force to be delivered to the rear wheels through the power coupling and uncoupling device 3) of the main clutch 39 to be adjusted. Upon adjustment of the coupling force of the power coupling and uncoupling device 3 in such a way, a drive power split ratio between the front wheels and the rear wheels can be arbitrarily regulated. If such control is performed during a turning run mode, this provides an improved controllability and stability of the vehicle.

As the electromagnet 5 is interrupted by the controller, the pilot clutch 11 is uncoupled to cause the ball cam 41 to loose the cam thrust force and the main clutch 39 is uncoupled causing the power coupling and uncoupling device 3 to be uncoupled. As the power coupling and uncoupling device 3 is uncoupled, the rear wheels are disconnected causing the vehicle to fall in the two-wheel drive condition for drive of the front wheels.

Further, during a period in which the electromagnet 5 is excited in a manner set forth above, magnetic reluctances occur in the air gaps 15, 17, in which the direction of the magnetic flux loop is substantially aligned in the axial direction (along a direction of a tangential line A in FIG. 2), between the rotor 9 and the inner shaft 25, the air gap 19 between the cam ring 27 and the inner shaft 25, the air gap 21, in which the direction of the magnetic flux loop is substantially aligned in a radial direction (along a direction of a tangential line B in FIG. 2), between the cam ring 27 and the pilot clutch 11, the slide bearing 23 between the rotor 9 and the inner shaft 25, and the inner shaft 25 between the rotor 9 and the inner periphery of the magnetic flux loop 31, respectively, minimizing the magnetic fluxes, caused by the localized magnetic flux loops that would occur from the magnetic flux loop 31, from leaking to the outside for thereby increasing the amount of magnetic fluxes that passes through the magnetic flux loop 31 to the armature 13.

Accordingly, this results in an increase in the coupling force (i.e., the pilot torque) of the pilot clutch 11 to be born by the armature 13. This is reflected in an increase in the cam thrust force of the ball cam 41 and the coupling force of the main clutch 39 and, hence, a sufficiently large amount of drive power can be transferred to the rear wheels through the electromagnetic actuator 3.

The oil sealed inside the rotary case 37 is retained in the oil sumps 45, 61 and, as the electromagnet coupling 3 rotates, the oil in the oil sump 45 is subjected to a centrifugal force and passes through the oil passage 47 and the bearing 71, thereby lubricating and cooling the main clutch 39, the ball cam 41, the bearings 71, 83, and the pilot clutch 11. Also, due to the presence of the oil apertures 99, 101 formed on an inner plate 79 and the pressure plate 81 of the main clutch 39, respectively, oil movements to sliding surfaces of the respective plates 77, 79, the ball cam 41, the pilot clutch 11 and the bearing 83 are promoted, thereby providing improved lubricating and cooling effects on these components.

[Effects of Electromagnetic Clutch Device 1 and Power Coupling and Uncoupling device 3]

The electromagnetic clutch device 1 and power coupling and uncoupling device 3 thus constructed as set forth above have advantageous effects as described below.

In close proximity to the members 5, 7, 9, 11, 13 (serving as the magnetic flux loop forming members) that form the magnetic flux loop 31 of the electromagnet 5, the air gaps 15, 17 are located between the rotor 9 and the inner shaft 25, the air gap 19 is located between the cam ring 27 and the inner shaft 25, the air gap 21 is located between the cam ring 27 and the pilot clutch 11 and the slide bearing 23 is located, as the small member having the lower magnetic permeability than those of the respective members 5, 7, 9, 11, 13, between the rotor 9 and the inner shaft 25 while permitting the inner shaft 25 to be made from material with the lower magnetic permeability than those of the respective members 5, 7,9, 11, 13 (to provide the magnetic flux leakage minimizing means), resulting in an increase in the amount of magnetic fluxes passing through the magnetic flux loop 31 while enabling reduction in loss of the magnetic fluxes to provide an improved energy efficiency.

Consequently, the pilot clutch 11 has an improved controllability followed by an improved controllability in the ball cam 41 and the main clutch 39 (power coupling and uncoupling device 3).

Further, no need arises for permitting the electromagnet 5 to be formed in a large size in structure with a view to improving the energy efficiency, resulting in a capability of avoiding an increase (increase in battery load) in electric power consumption, deterioration in fuel consumption of the engine and deterioration in an on-vehicle mount capability of the power coupling and uncoupling device 3.

Furthermore, due to the provision of a distance located along the axial direction to allow a seal functioning section, composed of the X-ring 73 and the extending portions 10, to be sandwiched between the opposed mating portions between the inner periphery of the rotor 9 and the outer periphery of the inner shaft 25, a required supporting relationship remains as it is between the rotor 9 and the inner shaft 25 while providing the improved energy efficiency as set forth above.

Moreover, through the use of the slide bearing 23 with the low magnetic permeability, the supporting relationship between the rotor 9 and the inner shaft 25 is maintained at a required level while providing the improved energy efficiency.

In addition, the use of the slide bearing 23 with the lower magnetic permeability than those of the respective members 5, 7, 9, 11, 13 enables the material of the inner shaft 25 to be freely selected, resulting in an increase in a selectable range to that extent.

Besides, the provision of the air gap 15 formed close proximity to the slide bearing 23 having the low magnetic permeability results in a further improvement in an energy efficiency.

Further, the provision of the slide bearing 23 with the low magnetic permeability, located on the end portion (at a rear end) of the inner shaft 25 in the axial direction thereof in opposition to the armature 13 in the axial direction thereof with respect to the electromagnet 5, allows the slide bearing 23 to be located on the axial end portion of the magnetic flux loop forming member and, hence, no magnetic reluctance of the slide bearing 23 interferes to form the magnetic flux loop 31, with a resultant increase in an energy efficiency.

Furthermore, the use of the slide bearing 23 allows the inner shaft 25 and the rotor 9 to maintain an increased supporting capability.

In addition, the use of the inner shaft 25, falling in the supporting relationship with the rotor 9, with the low magnetic permeability provides magnetic reluctance by which an energy efficiency is further improved.

Moreover, due to the provision of the air gap 19 formed in the support section 33 at the area remoter than the magnetic flux loop 31 between the inner shaft 25 and cam ring 27, no interference of magnetic reluctance of the air gap 19 occurs for formation of the magnetic flux loop 31 and, accordingly, an energy efficiency can be maintained at a high level.

Also, by permitting grease or oil to be retained in the air gaps (spatial areas) 15, 17, 19, 21 of the electromagnetic clutch device 1, the lubricating agent can be supplied to the peripheral magnetic flux loop forming members and the sliding areas between the proximate member and the seal, resulting in an improvement in economy and a cooling ability.

(Second Embodiment)

Figure 3:
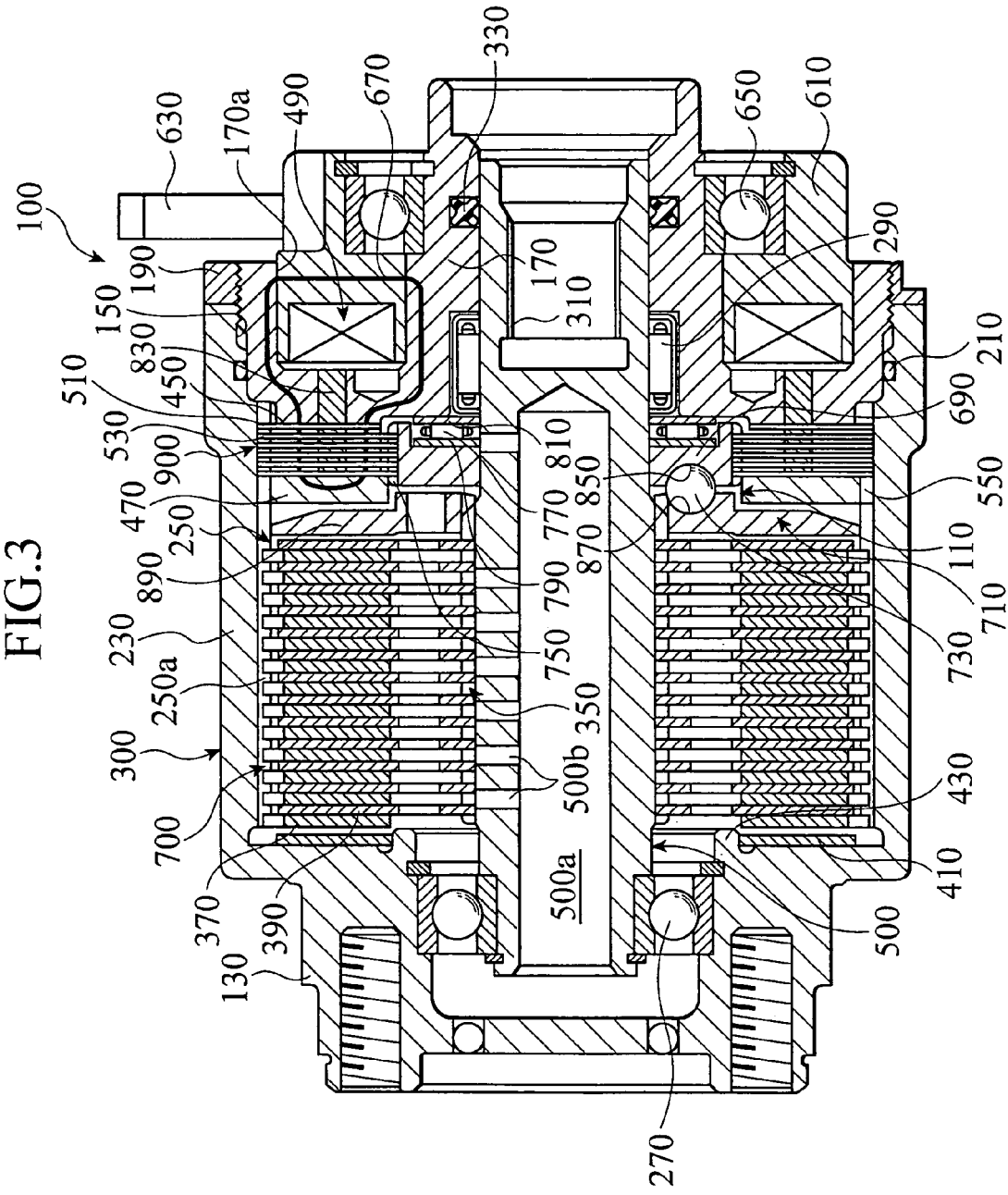
FIG. 3 is a cross sectional view illustrating a second embodiment of the present invention.
Figure 4:
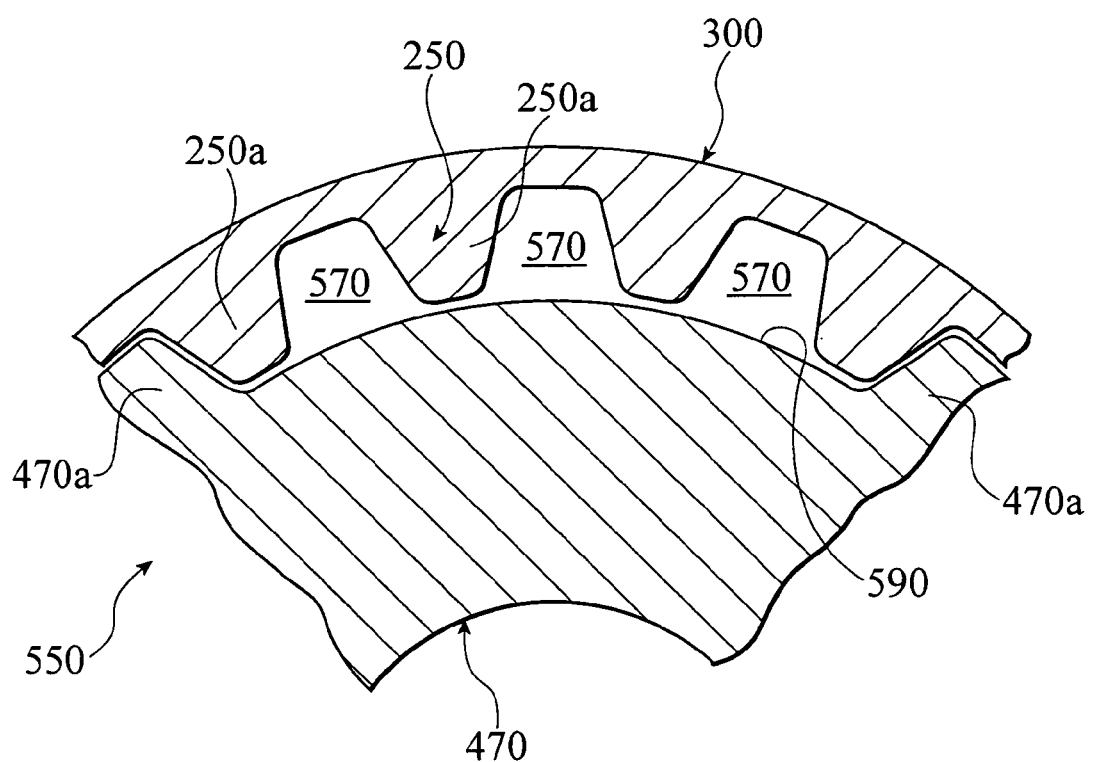
FIG. 4 is an enlarged view showing an essential part, in a large scale, of the second embodiment of the present invention.
Figure 5:
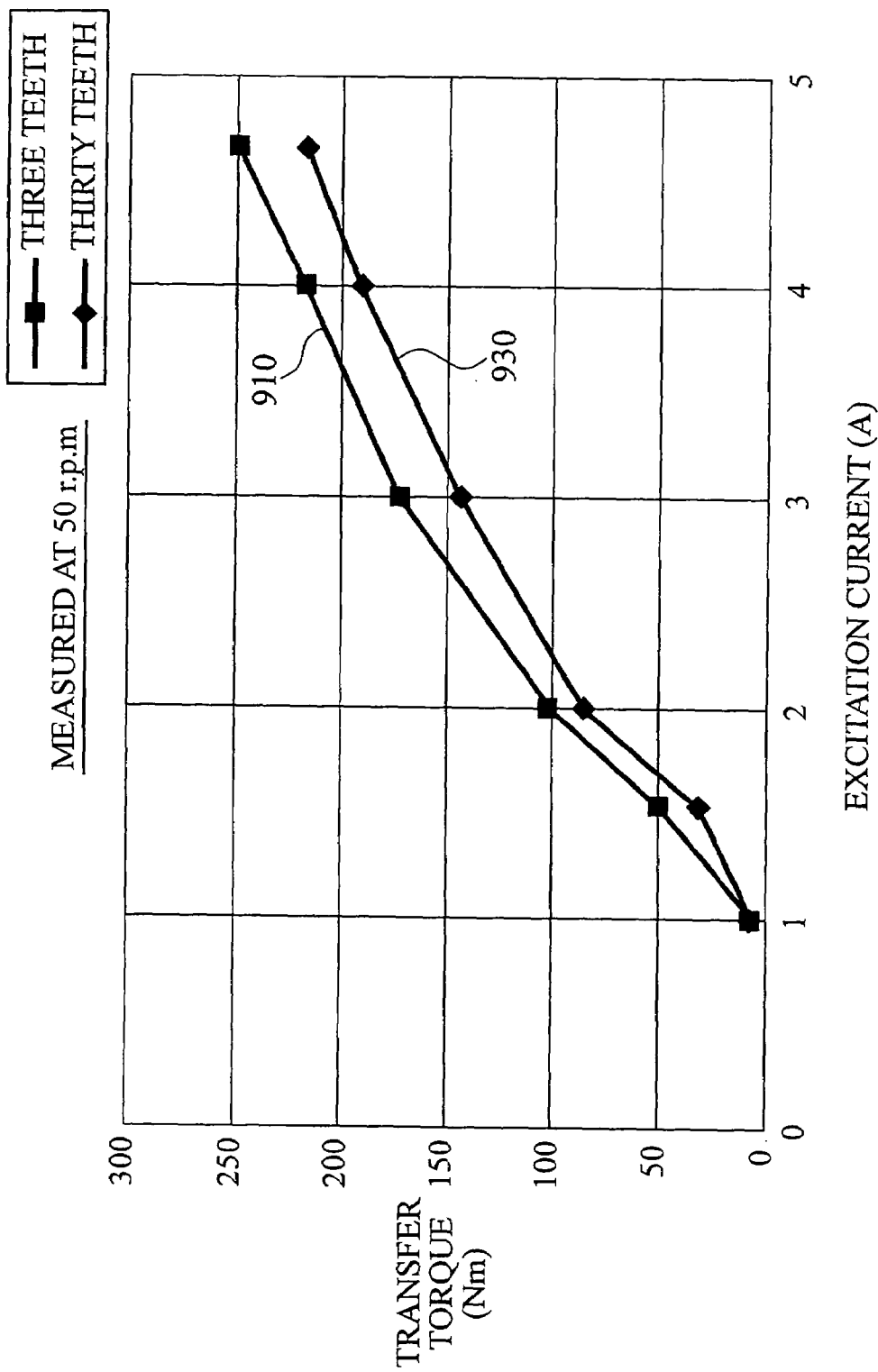
FIG. 5 is a graph in which comparison is made between the second embodiment and the related art device in respect of a varying characteristic of a transfer torque in terms of excitation current of an electromagnetic coil.

Next, referring to FIGS. 3 to 5, a second embodiment of the present invention is described. FIG. 3 is a cross sectional view of a power coupling and uncoupling device 100 incorporating an electromagnetic clutch 900, FIG. 4 is a cross sectional view showing a splined section 550 of electromagnetic clutch 900, and FIG. 5 is a graph illustrating a varying characteristic of a transfer torque in terms of excitation current of an electromagnetic coil 490.

[Structure of Power Coupling and Uncoupling device 100]

As shown in FIG. 3, the power coupling and uncoupling device 100 is comprised of a rotary case 300 (proximate (rotary) member) serving as an input member, a connecting shaft 500 (proximate member) serving as an output member to which a rotational drive power of the rotary case 300 is delivered, a multi-plate type main clutch 700 disposed between the rotary case 300 and the connecting shaft 500 to allow the rotational drive power of the rotary case 300 to be delivered to the connecting shaft 500, an electromagnetic clutch 900 adapted to controllably couple and uncouple the main clutch 700 while enabling control of a torque to be transferred through the main clutch 900, and a cam mechanism 110 disposed between the electromagnetic clutch device 900 and the main clutch 700 to cause a thrust force to occur due to the rotational drive power delivered from the electromagnetic clutch device 900 to allow the main clutch 700 to be coupled.

The rotary case 300 has a cylindrical shape in structure whose one end (on a left side in FIG. 3) is formed with a wall section 130 and is closed. The wall section 130 is connected to a transfer (not shown) to allow the rotational drive power to be delivered to the rotary case 300. Also, the other end (on a right side in FIG. 3) of the rotary case 300 is formed with an opening 150. Screwed to and coupled to the opening 150 is an outer periphery of a hollow rotor 170 (magnetic flux loop forming member), that is positioned with a lock nut 190 (proximate member). An O-ring 210 is disposed between the outer periphery of the rotor 170 and an inner periphery of a cylindrical section 230 of the rotary case 300, permitting the interior of the rotary case 300 to be tightly sealed. Also, formed on an inner peripheral wall of the hollow cylindrical section 230 is a splined section 250, and the connecting shaft 500 is disposed in an axial center section.

The connecting shaft 500 has one end, closer to the wall section 130, supported on an inner wall of the wall section 130 by means of a ball bearing 270 and the other end, closer to the opening 150, supported on an inner wall of the rotor 170 by means of a needle bearing 290 (proximate member). Centrally formed in the connecting shaft 500 at one end thereof is an oil sump 500a, with the connecting shaft 500 being formed with a plurality of oil passages 500b extending in a radial direction from the oil sump 500a. On the contrary, formed in the connecting shaft 500 at a right end axial center thereof is a splined section 310 with a similar bottom to which a rotary member of a propeller shaft (not shown) is spline connected. Also, disposed between an outer periphery of the right end of the connecting shaft 500 and the inner periphery of the rotor 170 is an X-ring 330 by which the interior of the rotary case 300 is tightly sealed. Additionally, formed on the outer periphery of the connecting shaft 500 in an area aligned with the oil passages 500b is a splined section 350. Disposed between the outer periphery of the connecting shaft 500 and the inner periphery of the rotary case 300 is the above-described main clutch 700.

The main clutch 700 is formed in a structure that includes a plurality of sheets of outer clutch plates 370 coupled to the splined section 250 of the inner periphery of the cylindrical section 230 of the rotary case 300, and a plurality of sheets of inner clutch plates 390 coupled to the splined section 350 of the outer periphery of the connecting shaft 500, with the outer clutch plates 370 and the inner clutch plates 390 being alternately disposed one another. Also, disposed adjacent to a left end of the outer clutch plates 370 is a spacer 410, for adjusting a gap in the main clutch 700, that is disposed on a convex portion 430 for a center link of the rotary case 300. With the main clutch 700, as the outer clutch plates 370 and the inner clutch plates 390 are coupled, the rotational drive power delivered to the rotary case 300 is delivered to the connecting shaft 500, and resulting torque to be delivered is controlled by the electromagnetic clutch device 900.

[Structure of Electromagnetic Clutch Device 900]

The electromagnetic clutch device 900 is comprised of a pilot clutch 450, an armature 470 (magnetic flux loop forming member) disposed on one side of the pilot clutch 450 for a free shifting capability, and an electromagnetic coil 490 disposed in opposition to the armature 490 intervening the pilot clutch 450 to permit the armature 470 to be attracted by the magnetic force and shifted for thereby operating coupling and uncoupling of the pilot clutch 450.

The pilot clutch 450 is comprised of outer clutch plates 510 coupled to the splined section 250 formed on the inner periphery of the cylinder section (serving as an approximate (rotary) member) 230 of the rotary case 300, and inner clutch plates 530 coupled to the splined section 750 formed on the outer periphery of a cam ring 690 (proximate member) of the cam mechanism 110 that will be described below. The pilot clutch 450 is coupled upon movement of the armature 470, thereby permitting the rotational drive power to be delivered to the cam ring 690 from the rotary case 300.

The armature 470 is disposed between the pilot clutch 450 (magnetic flux loop forming member) and the main clutch 700 and has an outer periphery formed with a splined section 550 that is coupled to the splined section 250 of the rotary case 300 for an axially shifting capability to be rotational with the rotary case (rotary member) 300. As shown in FIG. 4 in an enlarged scale, spline teeth 470a formed on the armature 470 engage associated spline teeth 250a of the splined section 250 formed on the inner periphery of the rotary case 300, and the armature 470 is formed with tooth-cut-out portions 570 (magnetic flux leakage eliminating means (magnetic flux leakage eliminating section)), resulting in formation of a wide air gap (an air space portion) 590 between the spline teeth 470a.

Further, the number of spline teeth 470a of the armature 470 is smaller in the number of teeth of the related art due to formation of the tooth-cut-out portions 570, with the number of teeth being selected to provide the air gap 590 as wide as possible within a range available to obtain a sufficient coupling function with the splined section. The armature 470 is axially shifted for operation due to the magnetic force applied by the electronic coil 490.

Fixedly mounted on a periphery of the electromagnetic coil 490 is a yoke 610, with the electromagnetic coil 490 and the yoke 610 being disposed in a concave section 170a of the rotor 170 in opposition to the pilot clutch 450. The yoke 610 located on the periphery of the electromagnetic coil 490 is supported on a stationary member of the vehicle body through a rotation limit member 630 for a non-rotating capability. Further, the yoke 610 is supported on the rotor 170 by means of a bearing 650. In addition, disposed on the rotor 170 is a non-magnetic member 830 that is located between the pilot clutch 450 and the electromagnetic coil 490. As the electromagnetic coil 490 is excited, a magnetic flux loop 670 is formed that passes through the rotor 170, the outer clutch plates 510 (magnetic flux loop forming member) and the rotary case 300 of the inner clutch plates 530 and passes through the armature 470, the outer clutch plates 510, the inner clutch plates 530 (magnetic flux loop forming member) and the rotor 170, causing the armature 470 to be attracted rightward in FIG. 3 to allow the pilot clutch 450 to be coupled such that the rotational drive power is delivered to the cam mechanism 110.

The cam mechanism 110 is comprised of the cam ring 690, a pressure plate 710 disposed between the armature 470 and the main clutch 700, and a ball 730 disposed between the cam ring 690 and the pressure plate 710.

The cam ring 690 has an inner periphery supported on the connecting shaft 5 and an outer periphery formed with a splined section 750 to which the inner clutch plates 530 of the pilot clutch 450 is spline coupled. Also, disposed on the rotor 170 of the cam ring 690 are ring-shaped plates 790, 810 (proximate members) between which a thrust bearing 770 is intervened. Formed on the cam ring 690 at a side closer to the main clutch 700 are a plurality of ball recesses 850 that are formed in circumferentially spaced positions for receiving halves of a plurality of balls 730, respectively. The pressure plate 710 is disposed in opposition to the cam ring 690 such that the balls 730 are sandwiched.

Formed on the pressure plate 710 in an inner diameter surface in opposition to the cam ring 690 are a plurality of ball recesses 870 for receiving halves of the plurality of balls 730, respectively, with the balls 730 being sandwiched between the pressure plate 710 and the cam ring 690. Also, formed on an outer diameter side of the pressure plate 710 is a presser section 890 by which the main clutch 700 is pressed. And, if the balls 830 come out from the associated ball recesses 850, 870 of the cam ring 690 and the pressure plate 710, respectively, while moving in rotation, the balls 830 allow the pressure plate 710 and the cam ring 690 to be remote in distance from one another. In this case, since the movement of the cam ring 690 toward the rotor 170 is limited through the ring-shape plates 790, 810 and the thrust bearing 770, a thrust force is created and the pressure plate 710 is moved toward the main clutch 700 that is consequently coupled.

[Operations and Actions of Power Coupling and Uncoupling Device 100 and Electromagnetic Clutch Device 900]

Upon excitation of the electromagnetic coil 490, the armature 470 is attracted to cause the pilot clutch 450 to be coupled at a given coupling force depending upon excitation current applied to the electromagnetic coil 490. thereby producing a pilot torque. The coupling torque (representative of transferred rotational drive power) of the pilot clutch 450 is amplified and converted by the cam mechanism 110, and the pressure plate 710 bears a resulting thrust force to push the main clutch 700 into a coupled condition. The coupling torque of the main clutch 700 is controlled through adjustment of the pilot clutch 450 upon control of excitation current being applied to the electromagnetic coil 490 and then, the drive power is delivered to the rear def.

FIG. 5 shows graphs 910, 930 representative of varying characteristics of transfer torques (Nm) in terms of excitation current (A) to be applied to the electromagnetic coil 490. Also, these transfer torques (Nm) were measured under a condition where the power coupling and uncoupling device 100 was regulated to obtain the rotational speed of 50 (rpm).

The graph 910 indicates a characteristic of the electromagnetic clutch device 900 of the presently filed embodiment wherein the spline teeth 470a is formed with the tooth-cut-out portions 570 to form the widened air gap 590 between the spline teeth 250a of the rotary case 300, and the graph 930 indicates a characteristic of the related art electromagnetic clutch device with tooth-cut-out portions formed between the spline teeth 470a of the armature 470 and the spline teeth 250a of the rotary case 300.

It will be appreciated from these graphs that due to the provision of the widened air gap 590 between the armature 470 and the splined section 250 of the rotary case 300, it becomes possible to remarkably eliminate the magnetic fluxes to be leaked from the armature 470 to the cylindrical section 230 of the rotary case 300 for thereby remarkably reducing a loss of magnetic fluxes and a loss of excitation current caused in the electromagnetic coil 490 resulting from leakage of the magnetic fluxes.

Further, the presence of the air gap 590 allows a frictional surface area of the splined section 250 to be decreased, resulting in reduction of shifting resistance (sliding resistance), to be applied to the armature 470, by that extent.

This allows the electromagnetic clutch device 900 to have a remarkably improved shifting operational force of the armature 470 to be effectuated by the electromagnetic coil 490 as compared to the related art electromagnetic clutch device. Consequently, the armature 470 has an improved operating response and smooth and stabilized movement capability while concurrently precluding deterioration in operating response and deterioration in stability of the movement capability as a result from shifting resistance to be applied to the armature 470.

[Effects of Power Coupling and Uncoupling Device 100 and Electromagnetic Clutch Device 900]

With the electromagnetic clutch device 900 of the presently filed embodiment, the presence of the tooth-cut-out portions 570 formed in the spline teeth 470a of the armature 470 to provide the widened air gap 590 between the armature 470 and the splined section 250 of the rotary case 300 allows remarkable reduction in magnetic loss and loss of excitation current of the electromagnetic coil 490 as a result from leakage of the magnetic fluxes, resulting in a capability of obtaining a further greater magnetic force when applying the electromagnetic coil 490 of the same size with excitation current at an equal value.

In addition, due to an ability of reducing the frictional surface area of the splined section 250 upon formation of the air gap 590, the shifting resistance to be applied to the armature 470 can be decreased, thereby preventing deterioration in operating response, unevenness in operating response and deterioration in the stability of operation.

Accordingly, the electromagnetic coil 490 has a remarkably improved shifting operational force and operating response associated with the armature 470 and makes it possible to obtain a smooth and stable operation, improving escaping capability and running ability of a vehicle during traveling on rough roads while avoiding a stack.

Further, due to reduction in leakage of the magnetic fluxes at the splined section 250, the rotary case 300 has an improved freedom not only in selection of expensive non-magnetic material such as aluminum alloy and stainless steel but also in selection of material using low cost magnetic material such as structural steel to provide a low cost, and it becomes possible to set a configuration to a profile to obtain an adequate strength.

Furthermore, since no need arises for making the electromagnetic coil 490 in a large size or increasing excitation current to provide an increased magnetic force for the purpose of augmenting deterioration in the shifting operational force of the armature 470, various advantages result in an a capability of avoiding deterioration in an on-vehicle mount capability of the power coupling and uncoupling device 100 resulting from an increase in load of a battery, deterioration in fuel consumption of an engine and an increase in size and weight.

Moreover, since the armature 470 is made simple in shape due to provision of the tooth-cut-out portions 570 formed between the spline teeth 470a, fabrication cost of the armature 470 is decreased to such extent while enabling to reduce a weight of the armature 470 by a value corresponding to the presence of the non-teeth portions 570.

Also, the relationship of the tooth-cut-out portion between the spline teeth of the armature 470 and the splined section 250a of the rotary case 300 can be similarly applied to engaging relationships, such as a spline engaging portion between the outer clutch plates 510, serving as the magnetic flux loop forming member, and the rotary case 300 or a spline engaging portion between the inner clutch plates 530 and the cam ring 690.

In such case, if the outer clutch plates 510 and the inner clutches 530 have functions to be attracted with the armature, the presence of the outer clutch plates 510 and the inner clutches 530 enables contribution to limit the magnetic flux from being leaked from the magnetic flux loop. Tooth-cut-out portions 590 and tooth-height adjusted teeth 1010 of third and fourth embodiments which will be described later may be similarly applied as technical concepts to the spline engaging portion of the pilot clutch 450.

(Third Embodiment)

Figure 6:
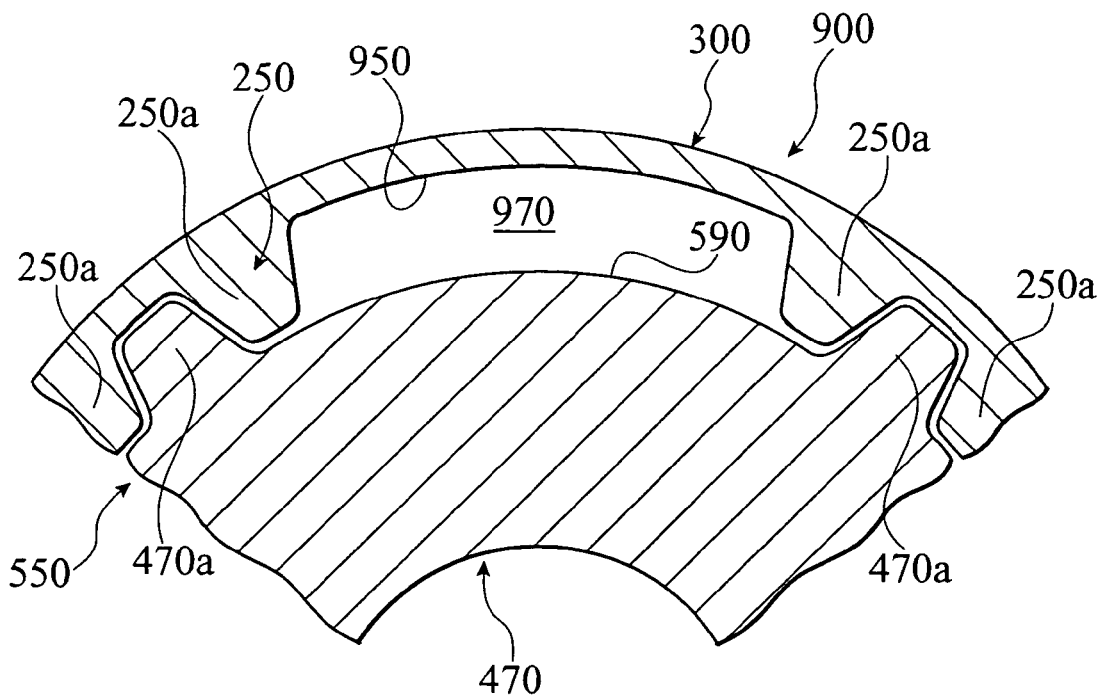
FIG. 6 is a cross sectional view showing an essential part, in an enlarged scale, of a third embodiment of the present invention.

Next, an electromagnetic clutch device of a third embodiment of the present invention is described with reference to FIG. 6. The electromagnetic clutch 900 of the third embodiment contemplates to have, in addition to the non-teeth portions 590 (serving as the magnetic flux leakage eliminating means (magnetic flux leakage eliminating section)) formed between the adjacent spline teeth 470a of the armature 470, the rotary case 300 formed with circumferentially spaced tooth-cut-out portions 950 (serving as magnetic flux leakage eliminating means (magnetic flux leakage eliminating section)) formed between the adjacent spline teeth 250a of the rotary case 300, thereby providing an extremely widened air gap 970 between the rotary case 300 and the armature 470.

With the electromagnetic clutch device 900 of the third embodiment, as set forth above, the provision of the tooth-cut-out portions 950 formed adjacent to teeth portions 250a on the inner periphery of the rotary case 300 in addition to the provision of the tooth-cut-out portions 570 formed on the outer periphery of the armature 470 provides a further increased air gap 970 in the splined section 250, resulting in an effect of minimizing leakage of the magnetic fluxes and providing a further improved effect to reduce a loss in a magnetic force and a loss in excitation current of the electromagnetic coil 490 resulting from leakage of the magnetic fluxes while obtaining an increased magnetic force (shifting operational force).

As a consequence, the electromagnetic coil 490 provides a remarkably improved shifting operational force and operating response of the armature 470 to enable a smooth and stabilized operation to be obtained, resulting in improvements in an escaping ability and running capability of the vehicle during traveling on rough roads while avoiding a stack. In addition, the power coupling and uncoupling device can be structured at low cost using the clutch housing 700 (connecting member 250) made from low cost magnetic material such as structural steel, resulting in a sufficient strength while avoiding an increase in load of a battery resulting from a large size of and an increase in excitation current of the electromagnetic coil 490, deterioration in fuel consumption of an engine and an on-vehicle mount capability of the power coupling and uncoupling device as a result of an increase in size and weight thereof.

Further, in addition to simplification in shape, a cost reduction effect and reduction in weight of the armature 470 resulting from the tooth-cut-out portions 570, the presence of the tooth-cut-out portions 950 of the splined section 250 of the rotary case 300 allows the power coupling and uncoupling device to be manufactured in a simple structure and at a low manufacturing cost, while achieving reduction in weight by a value corresponding to the tooth-cut-out portions 950.

(Fourth Embodiment)

Figure 7:
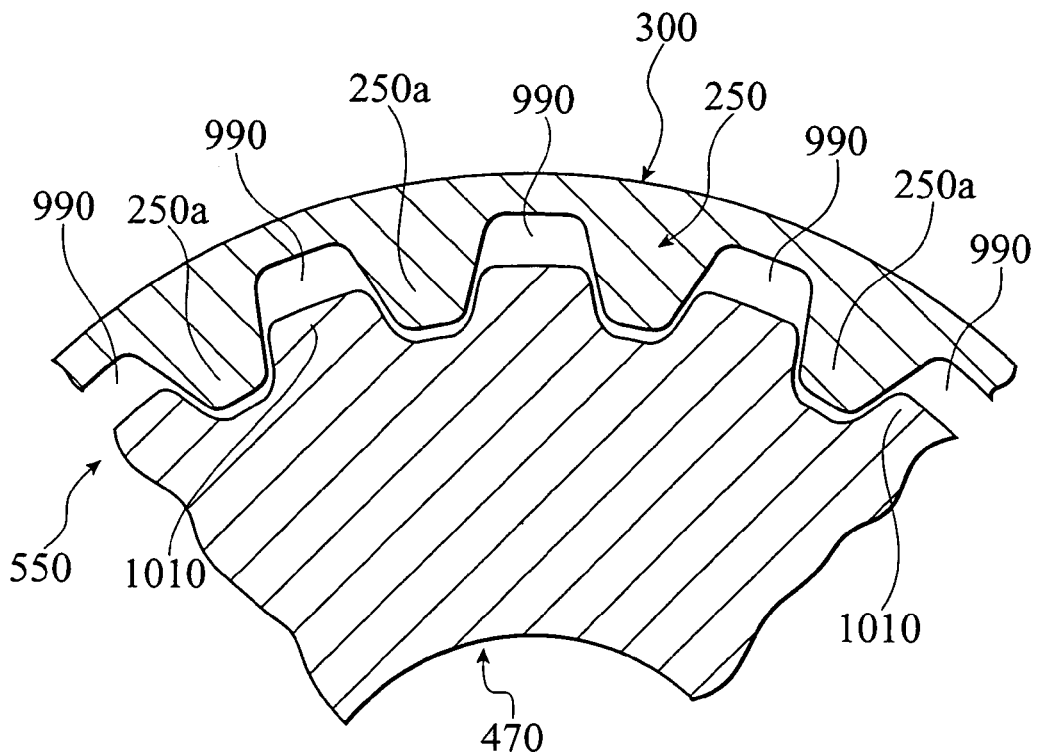
FIG. 7 is a cross sectional view showing an essential part, in an enlarged scale, of a fourth embodiment of the present invention.

Next, an electromagnetic clutch device of a fourth embodiment of the present invention is described with reference to FIG. 7. With the electromagnetic clutch of the fourth embodiment, in respect of the armature 470 and the splined section 250 of the rotary case 300, the armature 470 includes spline teeth 1010 (serving as magnetic flux leakage eliminating means (magnetic flux leakage eliminating section): tooth-height adjusted teeth) each with a low tooth height, resulting in formation of widened air gaps 990 between tops of the spline teeth 1010 of the armature 470 and bottoms of the spline teeth 250a of the rotary case 300, respectively. These spline teeth 1010 are selected to have a tooth height to widen the air gap 990 as large as possible within a range to enable the splined section 550 to have an adequate coupling function.

With the electromagnetic clutch device of the fourth embodiment, the provision of the armature 470 formed with the spline teeth 1010 each with the low tooth height provides increased air gaps 990 between the spline teeth 1010 of the armature 470 and the spline teeth 250a of the rotary case 300, resulting in an effect of minimizing leakage of the magnetic fluxes and providing a further improved effect to reduce a loss in a magnetic force and a loss in excitation current of the electromagnetic coil 490 resulting from leakage of the magnetic fluxes while obtaining an increased magnetic force (shifting operational force).

Accordingly, the electromagnetic coil 490 provides a remarkably improved shifting operational force and operating response of the armature 470 to enable a smooth and stabilized operation to be obtained, resulting in improvements in an escaping ability and running capability of the vehicle during traveling on rough roads while avoiding a stack. In addition, the power coupling and uncoupling device can be constructed at low cost using the clutch housing 700 (connecting member 250) made from low cost magnetic material such as structural steel, resulting in a sufficient strength while avoiding an increase in load of a battery resulting from a large size of and an increase in excitation current of the electromagnetic coil 490, deterioration in fuel consumption of an engine and an on-vehicle mount capability of the power coupling and uncoupling device as a result of an increase in size and weight thereof.

Further, the armature 470 is formed with the spline teeth 1010 with the low tooth height, resulting in reduction in weight.

Also, the electromagnetic clutch device of the presently filed embodiment may be used not only as the device of the other embodiment for transferring the drive power but also as a device (an electromagnetic brake) for delivering a braking force.

Furthermore, in the electromagnetic clutch device of the present invention, the clutch is comprised of not only a friction clutch but also a meshing clutch. Also, the frictional clutch may not be limited to the multi-plate type clutch and include a single plate type clutch or a cone clutch in contrast to the other embodiments.

Moreover, the electromagnetic clutch device of the present invention may include a frictional clutch composed of a rotor and an armature which are placed to be rotational with respect to one another to cause sliding friction between the rotor and the armature.

Further, the present invention may be modified to provide a structure wherein unlike the various embodiments, as the electromagnetic coil is excited, the clutch or main clutch are uncoupled and as the electromagnetic coil is de-energized, the clutch or the main clutch are coupled due to a shift spring.

Furthermore, the electromagnetic clutch device and the power coupling and uncoupling device of the present invention is not limited to particular fields such as a start clutch or a coupling and uncoupling and uncoupling device, like in the various embodiments to be mounted in a drive system of a vehicle and may have other applications such as a switch-over device that performs switch-over between drive sources in a hybrid vehicle.

Moreover, the present invention may be applied to a differential device wherein a differential mechanism is not limited to a bevel gear type differential mechanism and may include a differential mechanism of a planetary gear type, a differential mechanism with a def case having an accommodating bore which rotatably receives a pinion gear to which a side gear of an output side is coupled, and a differential mechanism employing a worm gear.

Also, a layout area of the differential device of the present invention includes any of a front def (a differential device by which a drive power of an engine is split to left and right front wheels), a rear def (a differential device by which the drive power of the engine is split to left and right rear wheels) and a center def (a differential device by which the drive power of the engine is split to the front and rear wheels).

As will be apparent from the foregoing description, with the electromagnetic clutch device of the present invention, since the magnetic flux leakage minimizing section is provided in at least one of the proximate members placed close proximity to the magnetic flux loop forming members that form the magnetic flux loop of the electromagnet, the leakage of magnetic fluxes resulting from the wasteful localized magnetic flux loops is minimized, thereby permitting a normal magnetic flux loop to be formed with a resultant increase in the amount of magnetic fluxes passing the armature by that extent for thereby improving an energy efficiency.

Accordingly, the control characteristic of the clutch is improved and no need arises in forming the electromagnet in a large size, resulting in avoidance in an increase (an increase in load of a battery) in electric power consumption and deteriorations in engine fuel consumption and an on-vehicle mount capability.

More particularly, with the electromagnetic clutch device of the present invention, the presence of magnetic reluctances, caused by the air gaps (spatial areas) formed adjacent to the area bearing the supporting relationship between the magnetic flux loop forming members and the proximate member, allows the leakage of magnetic fluxes resulting from the wasteful localized magnetic flux loops to be minimized, thereby permitting a normal magnetic flux loop to be formed with a resultant increase in the amount of magnetic fluxes passing the armature by that extent for thereby improving an energy efficiency.

Furthermore, due to the presence of the air gap formed adjacent to the area bearing in the supporting relationship, a desired supporting relationship can be maintained between the associated components as they are while providing an improved energy efficiency.

Moreover, with the electromagnetic clutch device of the present invention, by locating the support member, serving as the small member, having the lower magnetic permeability than that of the magnetic flux loop forming member, between the magnetic flux loop forming member and the proximate member, the leakage of magnetic fluxes resulting from the wasteful localized magnetic flux loops to be minimized, enabling a required supporting relationship to be maintained between the magnetic flux loop forming member and the approximate member while providing an improved energy efficiency.

In addition, due to the use of the support member, serving as the small member, having the lower magnetic permeability than that of the magnetic flux loop forming member, it is possible for the proximate member to be freely selected regardless of a high or low level of a magnetic permeability, resulting in an increased range of selection.

Further, with the electromagnetic clutch device of the present invention, the presence of magnetic reluctance, caused by the air gap (spatial area) formed adjacent to the support member having the low magnetic permeability between the magnetic flux loop forming members and the proximate member, allows an energy efficiency to be further improved.

Furthermore, the presence of a layout, wherein the support member having the low magnetic permeability is disposed on the axial end of the proximate member at a position in opposition to the armature in the axial direction with respect to the electromagnet, allows the support member having the low magnetic permeability to be located at the axial end of the magnetic flux loop forming member and no magnetic reluctance of the support member interfere the formation of the normal magnetic flux loop, resulting in a highly increased energy efficiency.

Moreover, this support member results in an increase in a supporting capability of the proximate member.

Besides, due to the presence of the proximate member, bearing the supporting relationship with the magnetic flux loop forming member, that is formed of material having the low magnetic permeability, resulting magnetic reluctance allows an energy efficiency to be further improved.

In addition, the air gap (spatial area), formed in the position associated with supporting relationship at the area remote from the magnetic flux loop forming member, has no interference on the formation of the normal magnetic flux loop, thereby permitting an energy efficiency to be highly maintained.

Also, since the electromagnetic device of the present invention is provided with the magnetic flux leakage minimizing section between the armature and the opposing member to increase the air gap, the leakage of the magnetic fluxes can be remarkably reduced.

Accordingly, this results in avoidance of a magnetic loss and a loss in excitation current of the electromagnetic coil, resulting from leakage of the magnetic fluxes, and deterioration in the shifting operational force of the armature, and the electromagnetic clutch is able to have an improved operating response while enabling to obtain a smooth and stable operation.

Further, the connecting area between the armature and the opposing member has a decreased frictional surface area due to the provision of the increased space (spatial area) to allow shifting resistance (sliding resistance) born by the armature to be decreased by that extent, preventing deterioration and unevenness in operating response, resulting from such shifting resistance, and deterioration in stability of operation.

Consequently, the use of the electromagnetic clutch device of the present invention as a start clutch of a vehicle enables the vehicle to have a rapid and stable starting property while permitting a transmission to have a rapid and stable shifting function.

Furthermore, the use of the electromagnetic clutch device of the present invention, as a power transfer device between front and rear wheels of an on-demand 4WD vehicle or a differential limiting-clutch of a differential device, provides advantages in improvements over an escaping ability and a running capability of a vehicle during traveling on rough roads while highly precluding a stack.

Moreover, a freedom is improved not only in consideration of selecting non-magnetic material, such as aluminum alloy or stainless steel, as the opposing member to which the armature is connected, but also in selection of low cost magnetic material such as structural steel, for avoiding leakage of the magnetic fluxes, while making it possible to form the opposing member at a low cost with an adequate strength.

Besides, no need arises for the electromagnetic coil to be formed in a large size or excitation current to be increased for increasing the magnetic force for the purpose of compensating deterioration in the shifting operational force of the armature, thereby precluding resulting occurrences such as an increase in load of the battery, deterioration in fuel consumption of the engine, and deterioration in an on-vehicle mount capability caused by a large size and an increased weight of the electromagnetic clutch as well as a device incorporating such a unit.

Additionally, with the electromagnetic device of the present invention, due to the provision of the tooth-cut-out portions serving as the magnetic flux leakage eliminating sections, the armature and the associated opposing member enable to have the splined section in s simplified structure, resulting in reduction in manufacturing cost while enabling reduction in weight by a value resulting from the formation of the tooth-cut-out portions. The spatial area defined with these tooth-cut-out portions permits oil to flow, resulting in improvement in economy and in a cooling capability.

Also, the tooth-cut-out portions serving as the magnetic flux leakage eliminating sections may be formed not only on the splined section of the armature but also on the splined portion of the opposing member, or may be located on both of the armature and the associated opposing member.

In addition, the armature and the opposing member can be reduced in weight by decreasing the tooth height of the spline teeth.

Moreover, in such a manner, the tooth-height adjusted teeth (the spline teeth with the low tooth height) may be formed on the armature or the opposing member, or may be formed on both the armature and the associated cooperating member.

Further, the tooth-height adjusted teeth (the spline teeth with the low tooth height) may be formed on all of the spline teeth of the armature and the opposing member, or may be formed on only a limited number of spline teeth.

Furthermore, the use of the electromagnetic clutch device of the present invention as a start clutch of a vehicle enables the vehicle to start traveling upon coupling of the clutch whereas upon uncoupling of the clutch, shift in a transmission can be easily performed.

Moreover, the electromagnetic clutch device of the present invention can be disposed in a power transfer system of wheels that are disconnected from a power delivery line during a two-wheel drive mode in a four-wheel drive vehicle, and coupling the clutch allows the vehicle to fall in a four-wheel drive condition whereas when uncoupling the clutch, the vehicle is rendered operative to operate in the two-wheel drive mode.

Also, the use of the electromagnetic clutch device of the present invention enables improvement in leakage of the magnetic fluxes and deterioration in the shifting operational force of the armature and operating response of the clutch can be improved to allow a smooth and stable coupling and uncoupling function to be obtained, while precluding a large size and increase in excitation current of the electromagnet coil, an increase in load of the battery, deterioration in fuel consumption of the engine and deterioration in an on-vehicle mount capability resulting from a large sized structure and an increased weight.

Although the present invention has been described above by reference to certain embodiments of the invention, the invention is not limited to the embodiments described above and modifications will occur to those skilled in the art, in light of the teachings. The scope of the invention is defined with reference to the following claims.

What is claimed is:

1. An electromagnetic clutch comprising:
   a magnetic flux loop forming member including a rotor, an armature and an electromagnet, having a coil and a yoke, the magnetic flux loop forming member forming a magnetic flux loop upon excitation of the coil;
   a clutch operative to be coupled or uncoupled by the armature that is operatively shifted in response to an electromagnetic force generating during excitation of the coil;
   a proximate member including a shaft member and a support member, the shaft member being placed closely proximate to the rotor and supporting the magnetic flux loop forming member via the support member; and
   a magnetic flux leakage eliminating section, including a plurality of spatial areas defined between an inner peripheral surface of the rotor and an outer peripheral surface of the proximate member; for eliminating an amount of magnetic fluxes leaked from the magnetic flux loop forming member to the proximate member during excitation of the coil.

2. The electromagnetic clutch according to claim 1, wherein the plurality of spatial areas are formed along an axial direction of the rotor.

3. The electromagnetic clutch according to claim 1, wherein the proximate member is made from material having a lower magnetic permeability than that of the magnetic flux loop forming member.

4. The electromagnetic clutch according to claim 1, wherein
the magnetic flux loop forming member and the support member are coaxially disposed with the shaft member.

5. The electromagnetic clutch according to claim 1, wherein
the proximate member further includes a rotary member supporting the magnetic flux loop forming member at an outside area in a radial direction of the shaft member, the rotary member being coaxially disposed with the shaft member; and
the magnetic flux leakage eliminating section includes a spatial area defined between an outer peripheral surface of the magnetic flux loop forming member and an inner peripheral surface of the rotary member.

6. The electromagnetic clutch according to claim 1 further comprising:
a frictional type main clutch disposed between input and output torque transfer members; and
a cam mechanism converting a torque, inputted through the clutch, into a pressure force; wherein
the clutch includes a pilot clutch whereby when the pilot clutch is coupled, the pressure force of the cam mechanism generating when applied with the torque urges the main clutch that is consequently coupled.

7. The electromagnetic clutch according to claim 1, wherein
the support member is disposed closely proximate to an end of the magnetic flux loop forming member at an area axially opposite to the armature with respect to the electromagnet.

8. The electromagnetic clutch according to claim 1, wherein
the proximate member includes an opposing member operative to allow the armature to be freely shifted through a connecting section located between the armature and the opposing member; and
the magnetic flux leakage eliminating section includes a spatial area disposed on the connecting section between the armature and the opposing member.

9. The electromagnetic clutch according to claim 8, further comprising:
a frictional type main clutch disposed between input and output torque transfer members; and
a cam mechanism converting a torque, inputted through the clutch, into a pressure force;
wherein
the clutch includes a pilot clutch whereby when the pilot clutch is coupled, the pressure force of the cam mechanism generating when applied with the torque urges the main clutch that is consequently coupled.

10. The electromagnetic clutch according to claim 1, further comprising:
a seal member disposed between the magnetic flux loop forming member and the shaft member, wherein
at least one of the plurality of spatial areas is formed on each side of the seal member along an axial direction of the rotor.

11. The electromagnetic clutch according to claim 1, wherein
the support member is a non-magnetic support ring.

12. The electromagnetic clutch according to claim 1, further comprising:
a pilot clutch disposed between the electromagnet and the armature; and
a cam ring engaged to the pilot clutch, wherein
the cam ring includes a support portion supporting the shaft member and a spatial area is defined between the outer periphery surface of the shaft member and an inner periphery surface of the cam ring.

13. An electromagnetic clutch comprising:
a magnetic flux loop forming member including an electromagnet, having a coil and a yoke, and an armature, and forming a magnetic flux loop upon excitation of the coil;
a clutch operative to be coupled or uncoupled by the armature that is operatively shifted in response to an electromagnetic force generating during excitation of the coil; and
a proximate member placed closely proximate to the magnetic flux loop forming member, wherein at least one of the magnetic flux loop forming member and the proximate member includes a magnetic flux leakage eliminating section eliminating an amount of magnetic fluxes leaked from the magnetic flux loop forming member to the proximate member during excitation of the coil,
wherein the proximate member includes an opposing member operative to allow the armature to be freely shifted through a connecting section located between the armature and the opposing member: and the magnetic flux leakage eliminating section is disposed on the connecting section between the armature and the opposing member, and
wherein the connecting section includes a splined section having mutually meshing spline teeth formed on the opposing member and the armature, respectively; and the magnetic flux leakage eliminating section includes spatial areas defined between tooth-cut-out portions, formed adjacent to the spline teeth of at least one of the opposing member and the armature, and the spline teeth of the other one of the opposing member and the armature.

14. An electromagnetic clutch comprising:
a magnetic flux loop forming member including an electromagnet, having a coil and a yoke, and an armature, and forming a magnetic flux loop upon excitation of the coil;
a clutch operative to be coupled or uncoupled by the armature that is operatively shifted in response to an electromagnetic force generating during excitation of the coil; and
a proximate member placed closely proximate to the magnetic flux loop forming member, wherein at least one of the magnetic flux loop forming member and the proximate member includes a magnetic flux leakage eliminating section eliminating an amount of magnetic fluxes leaked from the magnetic flux loop forming member to the proximate member during excitation of the coil,
wherein the proximate member includes an opposing member operative to allow the armature to be freely shifted through a connecting section located between the armature and the opposing member; and the magnetic flux leakage eliminating section is disposed on the connecting section between the armature and the opposing member, and
wherein the connecting section includes a splined section having mutually meshing spline teeth formed on the opposing member and the armature, respectively; and the magnetic flux leakage eliminating section includes spatial areas defined between tooth-height adjusted teeth, formed adjacent to the spline teeth of at least one of the opposing member and the armature, and the spline teeth of the other one of the opposing member and the armature.

15. An electromagnetic clutch device comprising:
a magnetic flux loop forming member including a rotor, an armature, an electromagnet, having a coil and a yoke, and a friction plate whose rotation is limited through shifting operation of the armature and operative to allow magnetic fluxes to pass to form a magnetic flux loop upon excitation of the coil; and
a proximate member including a shaft member and a support member supporting the shaft member, the shaft member being placed closely proximate to the rotor and supporting the magnetic flux loop forming member via the support member the; wherein
a plurality of spaced portions are formed in a part of opposing surfaces between the magnetic flux loop forming member and the proximate member so as to decrease a magnetic permeability of magnetic fluxes passing from the magnetic flux loop forming member to the proximate member for permitting the magnetic fluxes to be directed in a direction of the magnetic flux loop.

16. The electromagnetic clutch according to claim 15, wherein
the spaced portions are formed of air gaps, respectively, defined between the magnetic flux loop forming member and the proximate member.

17. The electromagnetic clutch according to claim 16, wherein
the spaced portions are formed air gaps, respectively, defined between at least a component of the magnetic flux loop forming member and the proximate member.

18. The electromagnetic clutch according to claim 16, wherein
the proximate member is made from material with a lower magnetic permeability than that of the magnetic flux loop forming member.

19. The electromagnetic clutch according to claim 16, wherein
the plurality of air gaps are disposed in at least one of an axial direction and a radial direction of the rotor.

20. The electromagnetic clutch according to claim 16, wherein
the plurality of air gaps are disposed at spaced intervals in an axial direction.

* * * * *